US012215649B2

(12) United States Patent
Sekine

(10) Patent No.: US 12,215,649 B2
(45) Date of Patent: Feb. 4, 2025

(54) COMPOSITE CYLINDER BLOCK

(71) Applicant: NISSAN MOTOR CO., LTD., Yokohama (JP)

(72) Inventor: Norikatsu Sekine, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/702,952

(22) PCT Filed: Oct. 22, 2021

(86) PCT No.: PCT/JP2021/039031
§ 371 (c)(1),
(2) Date: Apr. 19, 2024

(87) PCT Pub. No.: WO2023/067785
PCT Pub. Date: Apr. 27, 2023

(65) Prior Publication Data
US 2024/0418135 A1 Dec. 19, 2024

(51) Int. Cl.
*F02F 1/10* (2006.01)
*F02F 7/00* (2006.01)

(52) U.S. Cl.
CPC .............. *F02F 1/10* (2013.01); *F02F 7/0085* (2013.01)

(58) Field of Classification Search
CPC ... F02F 7/0085; F02F 7/0007; F05C 2253/20; F05C 2253/04; F05C 2253/16
USPC ....................................................... 123/41.72
See application file for complete search history.

(56) References Cited

U.S. PATENT DOCUMENTS 11,015,549 B1 * 5/2021 Ichikawa .............. F02F 7/0085
2019/0277220 A1 * 9/2019 Horigome ................. F02F 1/00
2021/0215119 A1 * 7/2021 Ichikawa .............. F02F 7/0053
2022/0082061 A1 * 3/2022 Okasaka ............... F02F 7/0085

FOREIGN PATENT DOCUMENTS

JP 2006-312905 A 11/2006
JP 2020-112147 A 7/2020

* cited by examiner

*Primary Examiner* — Long T Tran
*Assistant Examiner* — James J Kim
(74) *Attorney, Agent, or Firm* — Foley & Lardner LLP

(57) ABSTRACT

A cylinder block (1) includes a main block body (2) made of a metal material and an outer member (3) made of a resin material and welded to the main block body (2). The main block body (2) has a cylinder wall (13) defining therein a cylinder bore (16) and a second columnar part (14B) formed at a position apart from the cylinder wall (13). The outer member (3) has a second columnar part insertion hole (53) and defines a water jacket between the outer member (3) and the cylinder wall (13). The second columnar part (14B) is placed in the second columnar part insertion hole (53) with a predetermined clearance left between the second columnar part insertion hole (53) and the second columnar part (14B), in a state of being isolated from the water jacket, and extends to a cylinder head.

5 Claims, 11 Drawing Sheets

COMPOSITE CYLINDER BLOCK

TECHNICAL FIELD

The present invention relates to a composite cylinder block for an internal combustion engine, which is constituted by combination of a metallic member and a synthetic resinous member.

BACKGROUND ART

Patent Document 1 discloses an engine block in which a resinous block member is attached to an outer circumferential surface of a metallic cylinder liner.

The engine block of Patent Document 1 includes, in addition to the cylinder liner and the resinous block member, a metallic block member and metallic protrusions.

The metallic block member disclosed in Patent Document 1 is made of a metal material, and functions as a base to support the resinous block member.

The metallic protrusions disclosed in Patent Document 1 are formed with openings into which bolts for fixing a cylinder head are inserted, and protrude from the metallic block member toward the cylinder head.

In Patent Document 1, the water jacket is defined inside the resinous block member so that the resinous block member is prevented from being damaged by heat from the cylinder liner.

However, Patent Document 1 does not provide any disclosure about warm-up of the protrusions which are located outward of the water jacket and, by extension, about warm-up of the engine block.

There is thus still room for improvement in the configuration of the engine block with the metallic and resinous members in consideration of warm-up of the metallic member.

PRIOR ART DOCUMENTS

Patent Documents

Patent Document 1: Japanese Laid-Open Patent Publication No. 2020-112147

SUMMARY OF THE INVENTION

The present invention is directed to a composite cylinder block comprising: a main block body made of a metal material; and an outer member made of a resin material and welded to the main block body, the main block body having: a cylinder wall defining therein a cylinder bore; and a columnar part formed at a position apart from the cylinder wall, the outer member being arranged to define a water jacket between the main block body and the outer member, and the columnar part being placed in the outer member with a predetermined clearance left between the outer member and the columnar part, in a state of being isolated from the water jacket, and extending to a cylinder head.

In the composite cylinder block according to the present invention, the clearance between the columnar part of the main block body and the outer member serves as an air layer (insulating layer). This makes it less likely that the columnar part will be cooled by coolant during engine warm-up (warm-up of the internal combustion engine), thereby improving warm-up performance.

DESCRIPTION OF EMBODIMENTS

Hereinafter, one embodiment of the present invention will be described in detail below with reference to the drawings.

The overall configuration of a composite cylinder block 1 according to one embodiment of the present invention will be first explained below.

Figure 4:
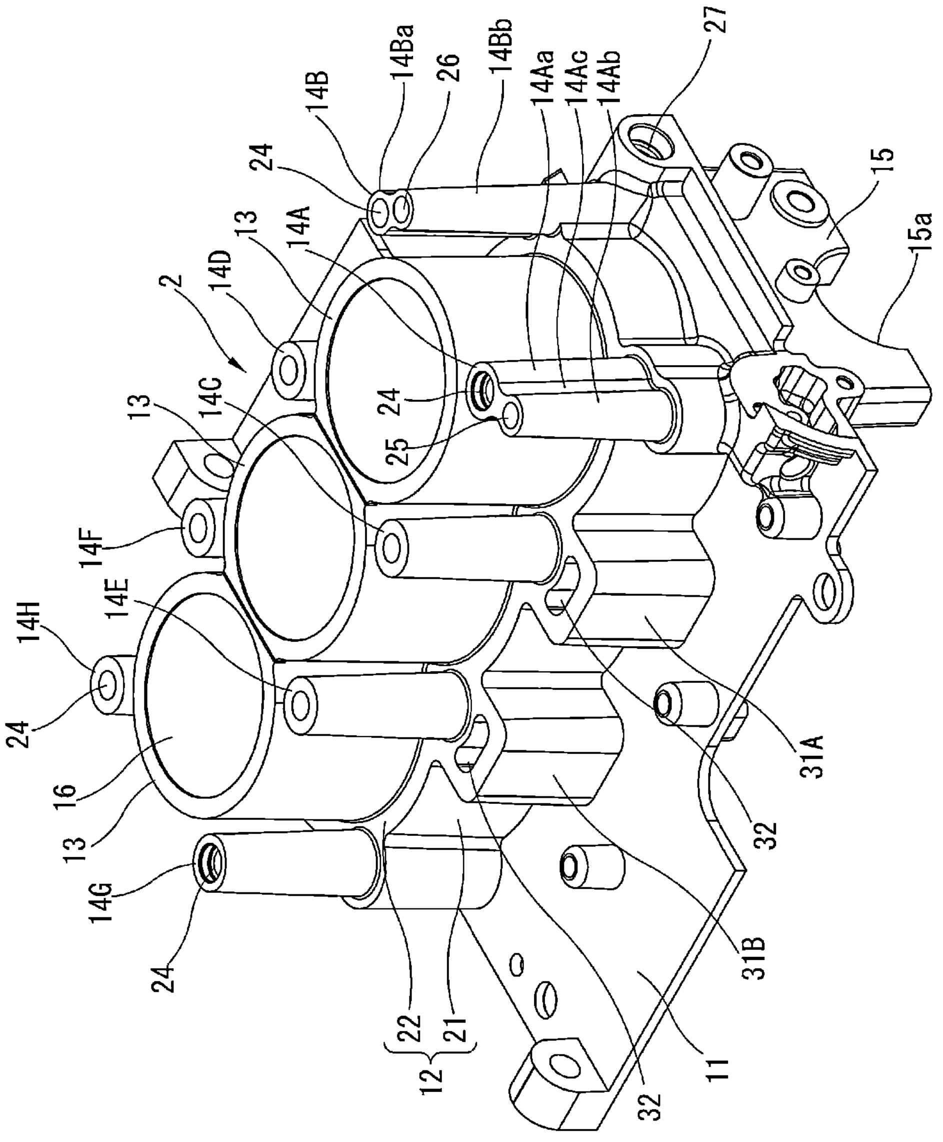
FIG. 4 is a perspective view of a main block body of the composite cylinder block.
Figure 5:
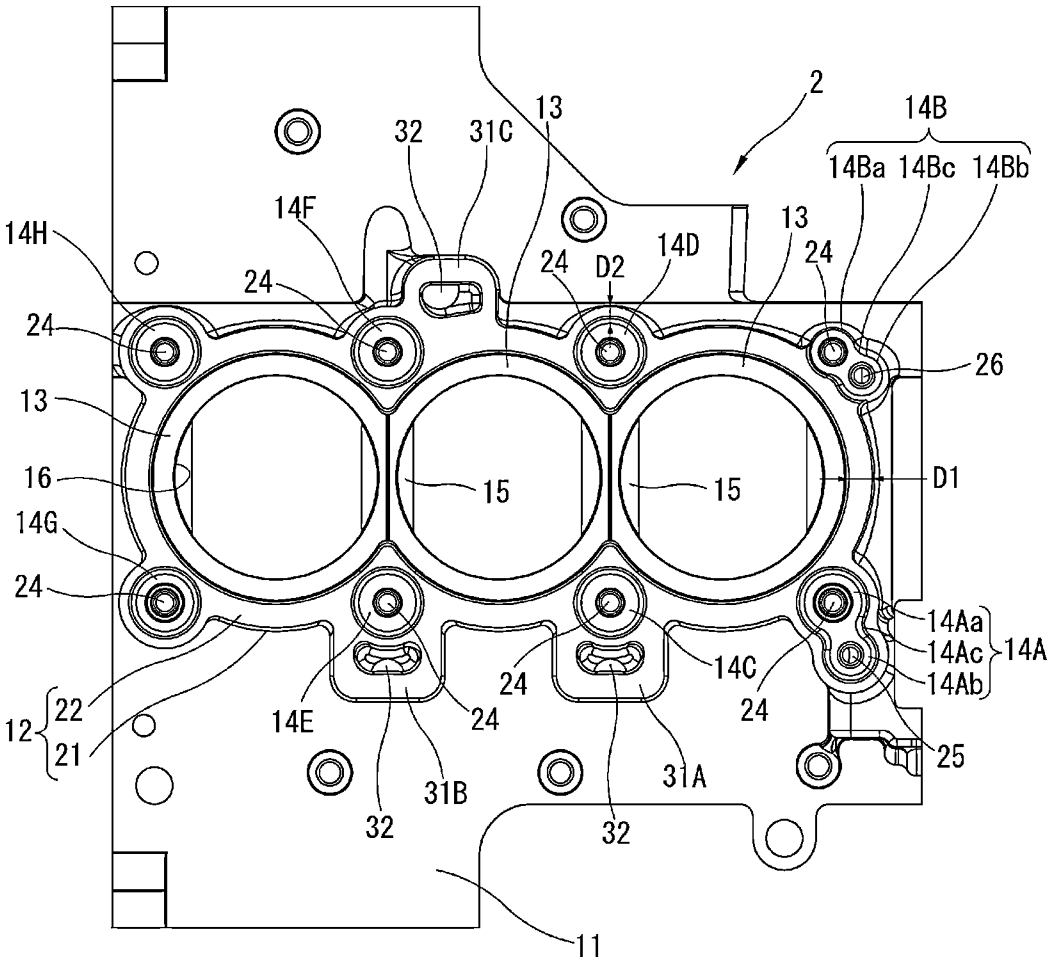
FIG. 5 is a plan view of the main block body.
Figure 6:
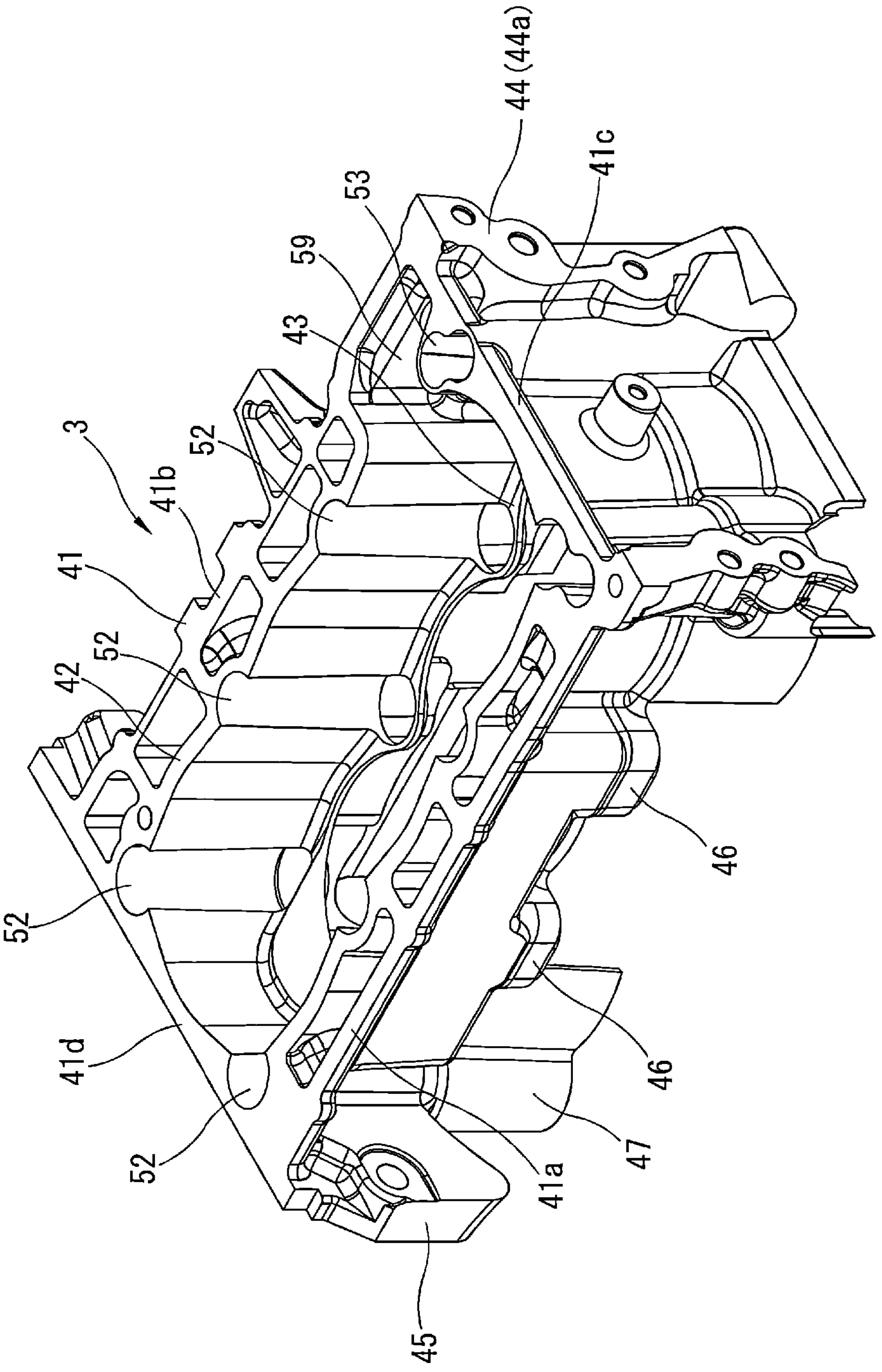
FIG. 6 is a perspective view of an outer member of the composite cylinder block.

The composite cylinder block 1 includes two members: a main block body 2 made of a metal material; and an outer member 3 made of a synthetic resin material. FIGS. 1 to 3 and FIG. 11 show the composite cylinder block 1 in which the main block body 2 and the outer member 3 are assembled together; FIGS. 4 and 5 show the main block body 2 alone; and FIGS. 6 to 10 show the outer member 3 alone. The main block body 2 and the outer member 3 are separately produced and then welded into one unit by the after-mentioned heat-welding technique.

In the present illustrated embodiment, the cylinder block 1 is adapted for use in an in-line three-cylinder engine. As indicated by the reference sign "#1" etc. in FIG. 1, three cylinders of the engine are respectively referred to as #1 cylinder, #2 cylinder and #3 cylinder in order from the right front side of FIG. 1 for illustration purposes. Further, the direction parallel to a line along which the centers of the three cylinders are aligned in a row is referred to as a "cylinder row direction"; the direction parallel to the center axes of the three cylinders is referred to as a "cylinder axis direction"; and the direction perpendicular to the cylinder row direction is referred to as a "width direction". The terms "upper", "upward", "lower", "downward" and the like are used in accordance with the directions of the normal top dead center and bottom dead center. It should be noted that the present invention is not limited for use in the in-line three-cylinder engine. The "front" of the cylinder block 1 refers to a #1 cylinder-side with respect to the cylinder row direction, whereas the "rear" of the cylinder block 1 refers to a #3 cylinder-side with respect to the cylinder row direction.

The metallic main block body 2 is an integrated body of parts to be subjected to a load or reaction force caused by a combustion/explosion event of the engine, and is integrally formed in one piece by casting of any appropriate metal material. In one preferable embodiment, the main block body 2 is integrally formed by die casting of an aluminum alloy. As shown in FIGS. 4 and 5, the main block body 2 includes: a lower deck 11 having a plate shape along a plane orthogonal to the cylinder axis direction; a base part 12 standing upward from an upper surface of the lower deck 11; three cylinder walls 13 each having a cylindrical shape and standing upward from the base part 12; total eight columnar parts 14 standing upward from the base part 12; and four main bearing parts 15 formed on a lower surface of the lower deck 11. There are cylinder bores 16 defined by the respective cylinder walls 13. These cylinder bores 16 extend through the base part 12 to the lower surface of the lower deck 11.

Figure 3:
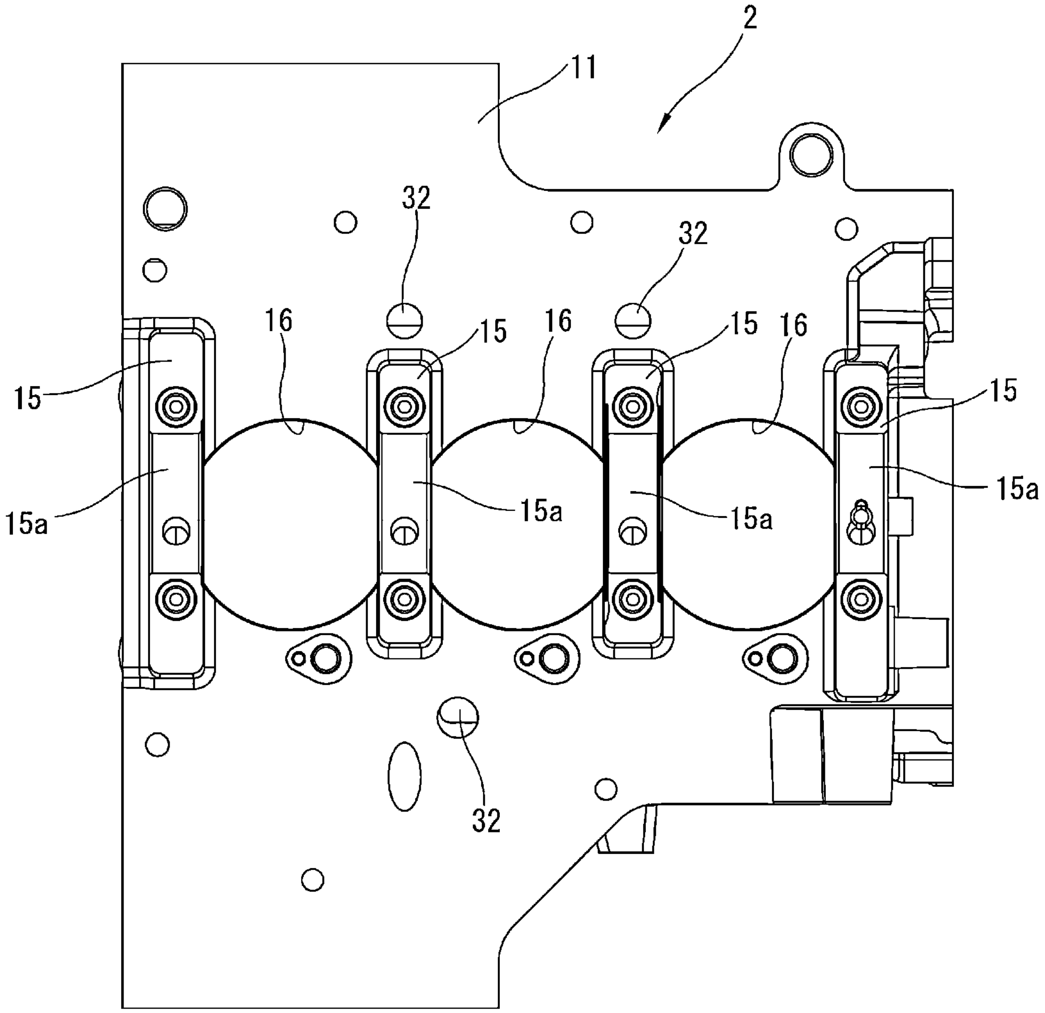
FIG. 3 is a bottom view of the composite cylinder block.

The lower deck 11 is laid substantially symmetrically in the width direction with respect to the row of the cylinders, and is shaped such that a #3 cylinder-side portion of the lower deck has a relatively large dimension in the width direction and such that a #1 cylinder-side portion of the lower deck has a relatively small dimension in the width direction (see FIG. 3). This plate-shaped lower deck 11 has an appropriate thickness to exhibit a required rigidity. Each of the cylinder bores 16 ends at the lower surface of the lower deck 11. In other words, the cylinder walls 13 do not protrude downward from the 10) lower deck 11. In a final assembled state of the internal combustion engine, a crankcase constituting part (such as oil pan) is attached to the lower surface of the lower deck 11.

The main bearing parts 15 are provided at total four positions, i.e., both front and rear end positions in the cylinder row direction and positions between the cylinders, so as to rotatably support a crankshaft of the engine. The main bearing parts 15 protrude downward from the lower surface of the lower deck 11 such that each of the main bearing parts 15 has a rectangular plate shape of relatively large thickness with a semicircular bearing recess 15*a* formed in the center of a lower surface thereof. In the final assembled state, a bearing cap is attached to these main bearing parts 15; and journal portions of the crankshaft are rotatably supported on the main bearing parts 15 via bearing metals. The lower surface of the lower deck 11, except the main bearing parts 15, is formed as a flat surface along one plane orthogonal to the cylinder axis direction.

The cylinder walls 13 have a cylindrical shape of substantially constant thickness (radial dimension). In the present illustrated embodiment, the three cylindrical cylinder walls 13 are arranged in a siamese configuration by being mutually connected at cylinder-to-cylinder portions thereof. In other words, the bore pitch of the cylinder walls 13 is set smaller than the outer diameter of the cylinder walls 13. Since the main block body 2 is made of an aluminum alloy in the present illustrated embodiment, a cylinder liner of cast iron is inserted into, or a wear-resistant metal is sprayed onto, an inner circumferential surface of the cylinder bore 16.

The base part 12 has a lateral surface 21 standing upward at a substantially right angle from the upper surface of the lower deck 11 and a top surface 22 extending in parallel with the upper and lower surfaces of the lower deck 11.

The columnar parts 14 stand upward at a substantially right angle (i.e., along the cylinder axis direction) from the top surface 22 of the base part 12.

The columnar parts 14 are provided at total eight positions, i.e., both front and rear end positions in the cylinder row direction and positions between the cylinders, in such a manner as to surround the row of the three cylinder walls 13 of the respective cylinders. For identification, the columnar parts 14 are hereinafter occasionally referred to as a first columnar part 14A, a second columnar part 14B, a third columnar part 14C, a fourth columnar part 14D, a fifth columnar part 14E, a sixth columnar part 14F, a seventh columnar part 14G and an eighth columnar part 14H, respectively, in order from the #1 cylinder side. These columnar parts are generically referred to as columnar parts 14 when not required to be identified. The columnar parts 14 are individually independent and are separate from the cylinder walls 13. The columnar parts 14 serve as bolt bosses into which cylinder head bolts (not shown) for fixing a cylinder head onto the cylinder block 1 are screwed.

Six of the columnar parts 14 other than the first and second columnar parts 14A and 14B, that is, the third to eighth columnar parts 14C to 14H each have a simple cylindrical column shape that is circular in cross section. Bolt holes 24 into which the cylinder head bolts are screwed are formed in the centers of upper end regions of the third to eighth columnar parts 14C to 14H, respectively. Basically, the third to eighth columnar parts 14C to 14H are equal in diameter to one another. Since the main block body 2 is formed by die casting in the present illustrated embodiment, a so-called draft angle is given as needed to each of surfaces of the respective block body parts oriented along the cylinder axis direction. Thus, in the strict sense, the third to eighth circular cylindrical columnar parts 14C to 14H have a tapered shape with the upper end regions thereof made smaller in diameter.

Differently from the third to eighth columnar parts 14C to 14H, the first columnar part 14A has such a shape that two parallel cylindrical columnar portions are joined at their outer circumferential regions. In other words, the first columnar part 14A is in the shape of the numeral "8" when viewed in plan as shown in FIG. 5 and when viewed in cross section perpendicular to the cylinder axis direction. More specifically, the first columnar part 14A has a main columnar portion 14Aa formed with the same diameter as those of the third to eighth columnar parts 14C to 14H and a sub columnar portion 14Ab formed with a smaller diameter than that of the main columnar portion 14Aa. These main and sub columnar portions are made integral with each other. As in the case of the third to eighth columnar parts 14C to 14H, the main columnar portion 14Aa serves as a bolt boss in which the cylinder head bolt is screwed. A bolt hole 24 is hence formed in the center of an upper end region of the main columnar portion 14Aa. The main columnar portion 14Aa is located at a position symmetric to the fourth columnar part 14D with respect to the center of the #1 cylinder, that is, at such a position that the total eight cylinder bolts are evenly arranged. The sub columnar portion 14Ab is located at a diagonally outer side of the main columnar portion 14Aa, that is, at a side of the main columnar portion 14Aa opposite from the cylinder wall 13 of the #1 cylinder. An oil passage 25 is formed in the center of the sub columnar portion 14Ab along the cylinder axis direction so as to supply therethrough oil pressurized by an oil pump to the cylinder head. The sub columnar portion 14Ab thus corresponds to a tube in which the oil passage 25 of circular cross section is defined. As mentioned above, the first columnar part 14A is shaped such that the main columnar portion 14Aa used as the bolt boss and the sub columnar portion 14Ab used as the tube for the oil passage 25 are joined together at their outer circumferential regions. There remain a pair of recessed gaps 14Ac between outer circumferential surfaces of these columnar portions.

Similarly to the first columnar part 14A, the second columnar part 14B has such a shape that two parallel cylindrical columnar portions are joined at their outer circumferential regions. In other words, the second columnar part 14B is in the shape of the numeral "8" when viewed in plan as shown in FIG. 5 and when viewed in cross section perpendicular to the cylinder axis direction. More specifically, the second columnar part 14B has a main columnar portion 14Ba formed with a smaller diameter than those of the third to eighth columnar parts 14C to 14H and a sub columnar portion 14Bb formed with a slightly smaller diameter than that of the main columnar portion 14Ba. These main and sub columnar portions are made integral with each other. As in the case of the third to eighth columnar parts 14C to 14H, the main columnar portion 14Ba serves as a bolt boss in which the cylinder head bolt is screwed. A bolt hole 24 is hence formed in the center of an upper end region of the main columnar portion 14Ba. The main columnar portion 14Ba is located at a position symmetric to the third columnar part 14C with respect to the center of the #1 cylinder, that is, at such a position that the total eight cylinder bolts are evenly arranged. The sub columnar portion 14Bb is located at a position in front of the main columnar portion 14Ba and inward of the main columnar portion 14Ba in the width direction, that is, at a position adjacent to the main columnar portion 14Ba on an arc about the cylinder center of the #1 cylinder. An oil passage 26 is formed in the center of the sub columnar portion 14Bb along the cylinder axis direction, so as to supply therethrough oil pressurized by the oil pump to the cylinder head, as in the case of the sub columnar portion 14Ab of the first columnar part 14A. The sub columnar portion 14Bb thus corresponds to a tube in which the oil passage 26 of circular cross section is defined. As mentioned above, the second columnar part 14B is shaped such that the main columnar portion 14Ba used as the bolt boss and the sub columnar portion 14Bb used as the tube for the oil passage 26 are joined together at their outer circumferential regions. There remain a pair of recessed gaps 14Bc between outer circumferential surfaces of these columnar portions.

In the present illustrated embodiment, the second columnar part 14B has a lower end region integrally continuing to the lateral surface 21 of the base part 12; whereas the other columnar parts 14 (i.e. the first and third to eighth columnar parts 14A and 14C to 14H) protrude from the top surface 22 of the base part 12 without continuing to the lateral surface 21 of the base part 12. More specifically, the outer circumferential surface of the "8"-shaped cross-sectional second columnar part 14B is formed such that an inner region of the outer circumferential surface (facing the cylinder wall 13) extends upward from the top surface 22 of the base part 12 and such that an outer region of the outer circumferential surface (facing away from the cylinder wall 13) extends downward across the top surface 22 and continues to the lower deck 11.

Figure 11:
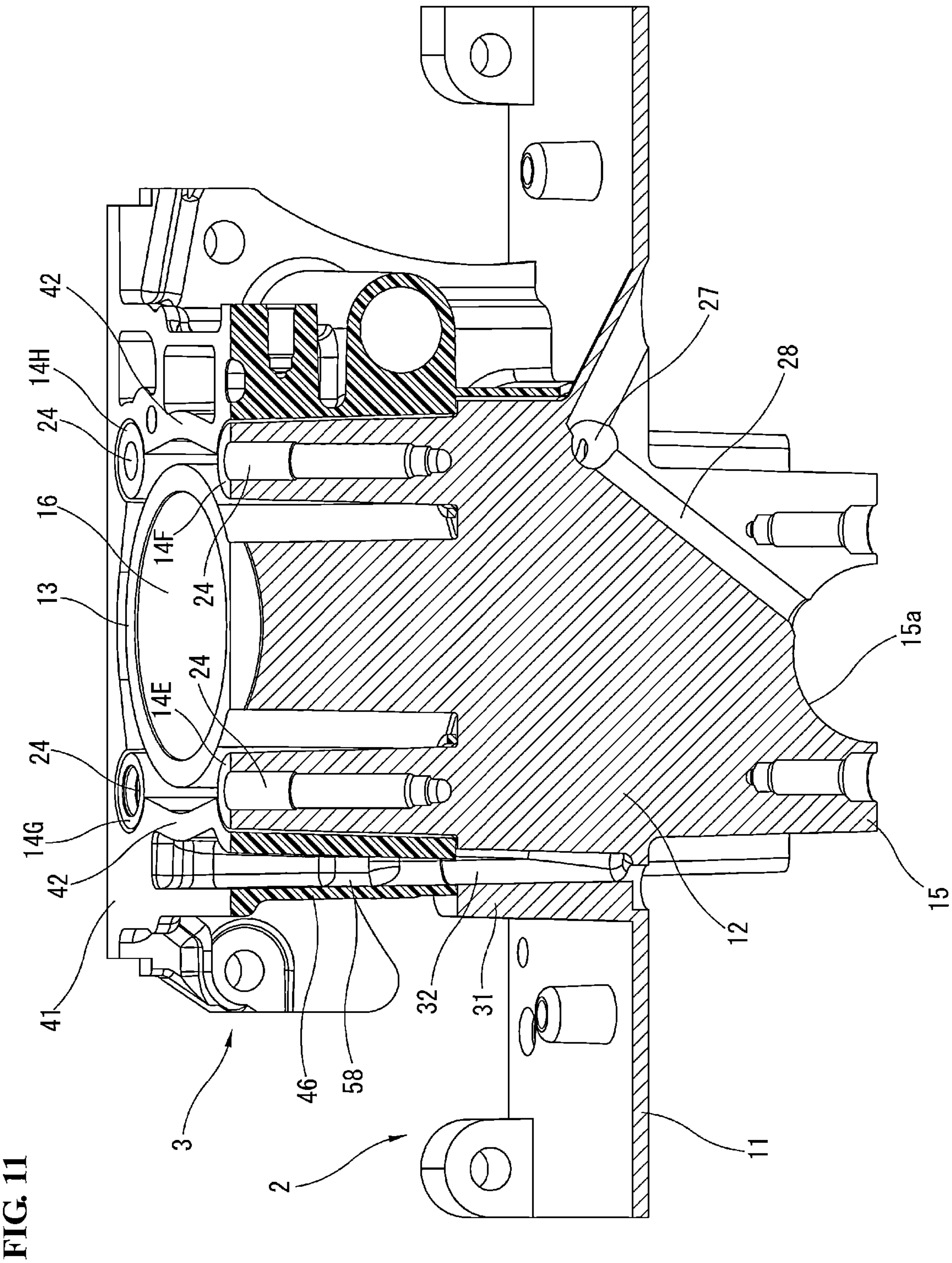
FIG. 11 is a perspective cross-sectional view of the composite cylinder block as taken along line A-A of FIG. 2.

A lower end region of the oil passage 25 formed through the first columnar part 14A and a lower end region of the oil passage 26 formed through the second columnar part 14B are in communication with a sub oil gallery (not shown) that is formed in the vicinity of a front end portion of the lower deck 11 to extend along the width direction of the main block body 2. The sub oil gallery extending along the width direction is in communication with a main oil gallery 27 (see FIG. 11 and FIG. 4) that is formed on a lower lateral side of the row of the cylinder walls 13 to extend along the cylinder row direction. High-pressure oil (lubricant), which has been pressurized by the oil pump, is supplied to the main oil gallery 27. A part of the high-pressure oil is supplied to the cylinder head side via the two oil passages 25 and 26. Further, a part of the high-pressure oil is supplied to the bearing recesses 15*a* via oil passages 28 that are formed to pass through the main bearing parts 15 as shown in FIG. 11.

The base part 12 is formed to not only project outwardly with a substantially constant width from the outer contours of the three series-arranged cylinder walls 13, but also project outwardly with a substantially constant width from the outer contours of the columnar parts 14 except the second columnar part 14B. The lateral surface 21 of the base part 12 is thus shaped to extend along the outer contours of the cylinder walls 13 and the columnar parts 14 and surround the outer sides of the cylinder walls 13 and the columnar parts 14. Basically, the lateral surface 21 is defined by a combination of circular cylindrical surfaces concentric to the cylinder walls 13 and circular cylindrical surfaces concentric to the columnar parts 14.

In other words, as shown in FIG. 5, the top surface 22 is present with a substantially constant width (as indicated by the reference sign "D1" in FIG. 5) around the cylinder walls 13 except regions adjacent to the columnar parts 14 and is present with a substantially constant relatively narrow width (as indicated by the reference sign "D2" in FIG. 5) around the columnar parts 14. Around the first columnar part 14A, the top surface 22 is present with a width similar to that around the other columnar parts 14 along the "8"-shaped cross section of the first columnar part 14A. The top surface 22 is also present with a relatively narrow width between the columnar parts 14 except the second columnar part 14B and the cylinder walls 13 adjacent thereto.

Since both of the main and sub columnar portions 14Ba and 14Bb of the second columnar part 14B are smaller in diameter than the other columnar parts 14, the top surface 22 is present between the second columnar part 14B and the cylinder wall 13 with the same degree of width as the width (see D1 in FIG. 5) of the top surface except the regions adjacent to the other columnar parts 14. On the other hand, the top surface 22 is not present on the outer side of the second columnar part 14B.

Further, the base part 12 has oil drop hole defining portions 31 provided at three positions. Each of the oil drop hole defining portions 31 is rectangular-shaped in plan view. The first oil drop hole defining portion 31A is located at a position between the #1 cylinder and the #2 cylinder and outward of the third columnar part 14C. The second oil drop hole defining portion 31B is located at a position between the #2 cylinder and the #3 cylinder and outward of the fifth columnar part 14E. The third oil drop hole defining portion 31C is located at a position between the fourth and sixth columnar parts 14D and 14F, that is, lateral to the #2 cylinder on a side of the cylinder row opposite from these two oil drop hole defining portions 31A and 31B. Lower-half oil drop holes 32 are defined in center regions of the oil drop hole defining portions 31, respectively, in such a manner as to extend along the cylinder axis direction. As will be explained later, these lower-half oil drop holes 32 constitute parts of oil drop holes through which oil used in the cylinder head side is returned to the inside of the crankcase under its own weight. Although the opening of the lower-half oil drop hole 32 has a substantially rectangular cross-sectional shape elongated in the cylinder row direction as shown in FIG. 5, the final oil outlet end of the lower-half oil drop hole 32 at the lower surface of the lower deck 11 is narrowed into a circular shape as shown in FIG. 3.

As shown in FIGS. 4 and 5, the oil drop hole defining portions 31 are provided as portions of the base part 12, with heights equal to those of portions of the base part 12 around the cylinder walls 13, such that regions of the top surface 22 of the base part 12 forming the same plane surround the lower-half oil drop holes 32.

The entire top surface 22 of the base part 12, including the regions around the cylinder walls 13, the regions around the columnar parts 14 and the regions around the lower-half oil drop holes 32, is arranged along one plane orthogonal to the cylinder axis direction. As will be explained later, the top surface 22 serves as a mating surface for the synthetic resinous outer member 3. This top surface 22 is a flat surface orthogonal to the cylinder axis direction, that is, a flat surface parallel to the lower surface of the lower deck 11.

The synthetic resinous outer member 3 is configured to constitute a water jacket for flow of coolant between the main block body 2 and the outer member 3 and to constitute an upper deck with a mating surface for the cylinder head, rather than configured to be subjected to a load or reaction force caused by a combustion/explosion event of the internal combustion engine. The outer member 3 is integrally formed in one piece of any appropriate synthetic resin material. In one preferable embodiment, the outer member 3 is formed by injection molding of a thermoplastic resin such as a fiber-reinforced resin in which a glass fiber is mixed with a polyamide resin.

As shown in FIGS. 6 to 10, the outer member 3 as a whole is substantially rectangular flame- or cylindrical-shaped. Mainly, the outer member 3 includes: an upper deck 41 having a mating or boundary surface for the cylinder head; a water jacket constituting wall 42 constituting the water jacket by surrounding the cylinder walls 13 and the columnar parts 14 except the second columnar part 14B of the main block body 2; a joint flange part 43 protruding inwardly from a lower end of the water jacket constituting wall 42; front and rear flange parts 44 and 45 defining front and rear end surfaces of the composite cylinder block 1, respectively; oil drop hole defining portions 46 corresponding to the oil drop hole defining portions 31 of the main block body 2, respectively; and a lower lateral wall part 47 surrounding the circumference of the base part 12 of the main block body 2. As will be explained later, the outer member 3 is combined with the main block body 2 by being placed over the main block body 2 while installing the cylinder walls 13 of the main block body 2 in an inner circumferential side of the water jacket constituting wall 42.

The upper deck 41 is continuous in a substantially rectangular frame shape at an upper end of the outer member 3. An upper surface of the upper deck 41 is formed as a flat surface along one plane orthogonal to the cylinder axis direction. The upper deck 41 includes left and right side edge portions **41*a* and 41*b*, a front end edge portion 41*c* and a rear end edge portion 41*d*, each of which is linear in shape. A plurality of ribs 41*e* are provided on the side edge portions 41*a* and 41*b* in such a manner as to extend in the width direction so that the side edge portions 41*a* and 41*b* are connected via these ribs to an upper portion of the water jacket constituting wall 42 on inner sides of the edge portions. An upper end face of the water jacket constituting wall 42 is formed as a portion of the upper deck 41 and is aligned in the same plane with the side edge portions 41*a* and 41*b*, the front end edge portion 41*c* and the rear end edge portion 41. The cylinder head is mounted on the upper deck 41 via a cylinder head gasket (not shown). As the cylinder head gasket, there can be used a composite gasket having a metal seal portion brought into contact with the metallic main block body 2 such as the top surfaces of the cylinder walls 13 and a rubber seal portion brought into contact with the synthetic resinous upper deck 41**.

Figure 9:
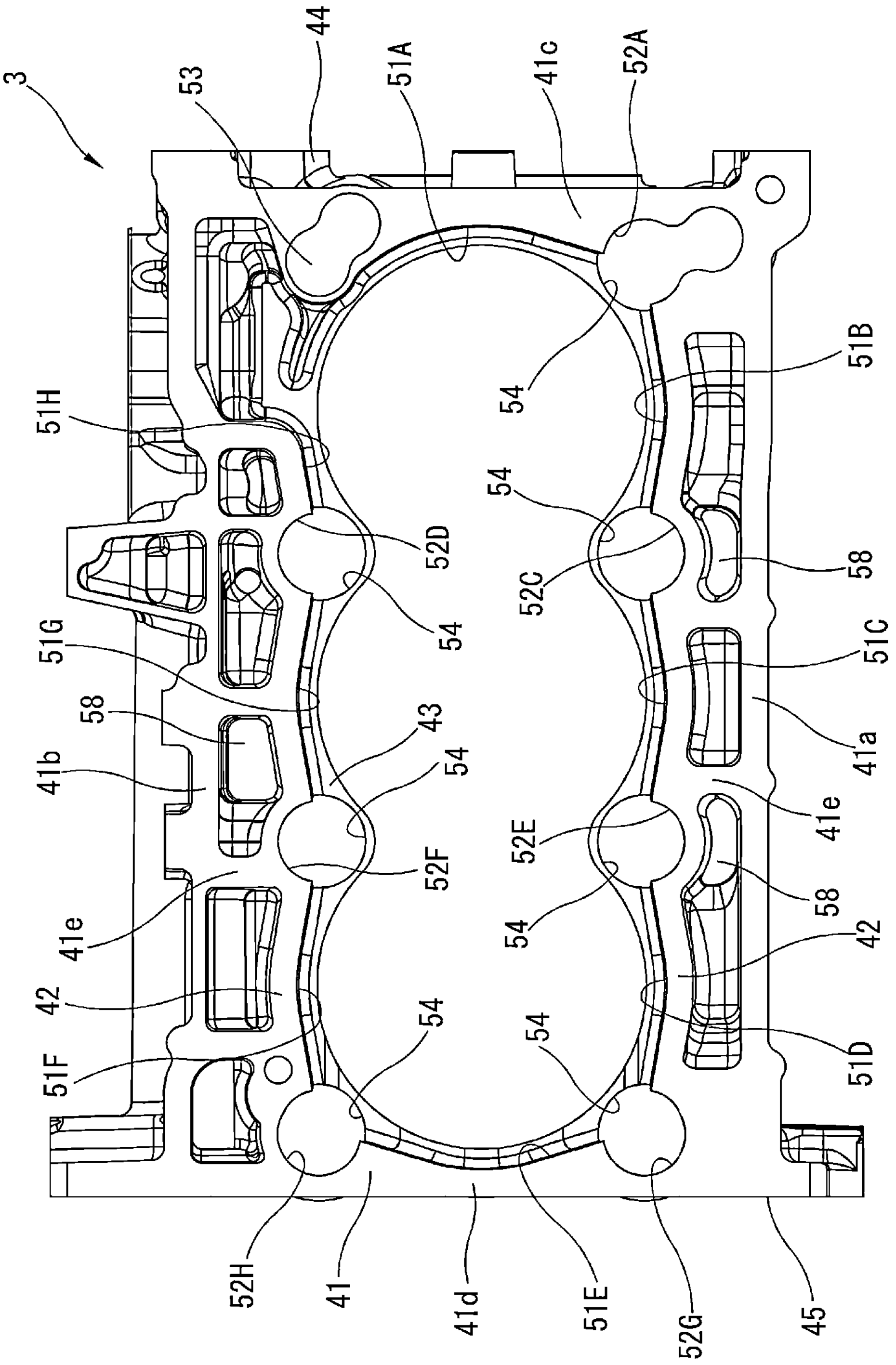
FIG. 9 is a plan view of the outer member.

The water jacket constituting wall 42 is generally shaped to, when viewed in plan, extend along the outer contours of the cylinder walls 13 and the columnar parts 14 (except the second columnar part 14B) of the main block body 2, and has a wall surface substantially parallel to the cylinder axis direction. More specifically, the wall surface of the water jacket constituting wall 42 combines total eight, relatively gently curved cylinder-facing surfaces 51, three on each of the left and right sides and one each on the front and rear end sides, with seven columnar part-facing surfaces 52 surrounding the columnar parts 14 except the second columnar part 14B. As shown in FIG. 9, the eight cylinder-facing surfaces 51, when required to be individually identified, are referred to as a first cylinder-facing surface 51A, a second cylinder-facing surface 51B . . . and an eighth cylinder-facing surface 51H in this order from the front end side in the clockwise direction. The seven columnar part-facing surfaces 52 are individually identified as a first columnar part-facing surfaces 52A, a third columnar part-facing surfaces 52C . . . and an eighth columnar part-facing surfaces 52H in conformity with the designations of the columnar parts 14 fitted in the columnar part-facing surfaces 52. Each of the columnar part-facing surfaces 52 is located between adjacent two of the cylinder-facing surfaces 51 and is concave-shaped as a concave recessed surface with a relatively small curvature radius.

Figure 1:
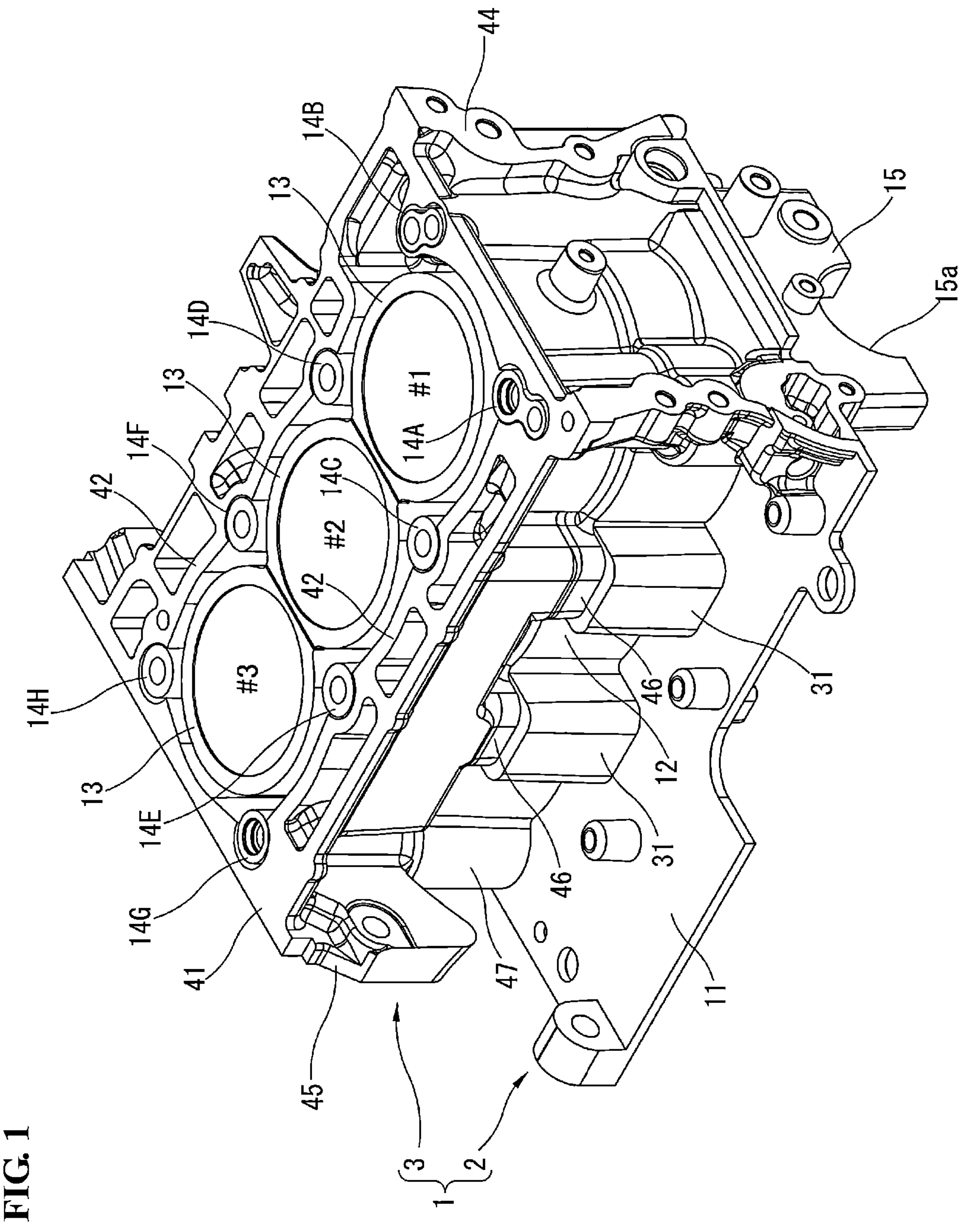
FIG. 1 is a perspective view of a composite cylinder block according to one embodiment of the present invention.

The cylinder-facing surfaces 51 are each positioned to, when the outer member is assembled with the main block body 2, provide an adequate spacing of the order of several millimeters (that is, water jacket) between the cylinder wall 13 and the cylinder-facing surface 51. On the other hand, the columnar part-facing surfaces 52 are each formed in an arc shape of slightly larger diameter than that of the columnar parts 14 to provide a relatively small spacing between the outer circumferential surface of the columnar part 14 and the columnar part-facing surface 52 and, when the outer member is assembled with the main block body 2, be generally concentric with the columnar part 14. More specifically, the third to sixth columnar part-facing surfaces 52C to 52F corresponding to the third to sixth columnar parts 14C to 14F are formed as arc surfaces of substantially semicircular cross section. The seventh and eighth columnar part-facing surfaces 52G and 52H corresponding to the seventh and eighth columnar parts 14G and 14H, which are positioned at corners of one end side of the continuous water jacket, are formed as arc surfaces of about three-quarter circular cross section larger than semicircular cross section. In other words, the seventh and eighth columnar part-facing surfaces 52G and 52H are formed to surround about three-quarter of the circumferences of the seventh and eighth columnar parts 14G and 14H. The first columnar part-facing surface 52A corresponding to the first columnar part 14A has a cross sectional shape extending along the outer contour of the "8"-shaped cross-sectional first columnar part 14A with a slight spacing left along the entire circumference. Hence, the first columnar part 14A is fitted in the first columnar part-facing surface 52A with a slight spacing left around the entire circumference as shown in FIG. 1.

Figure 2:
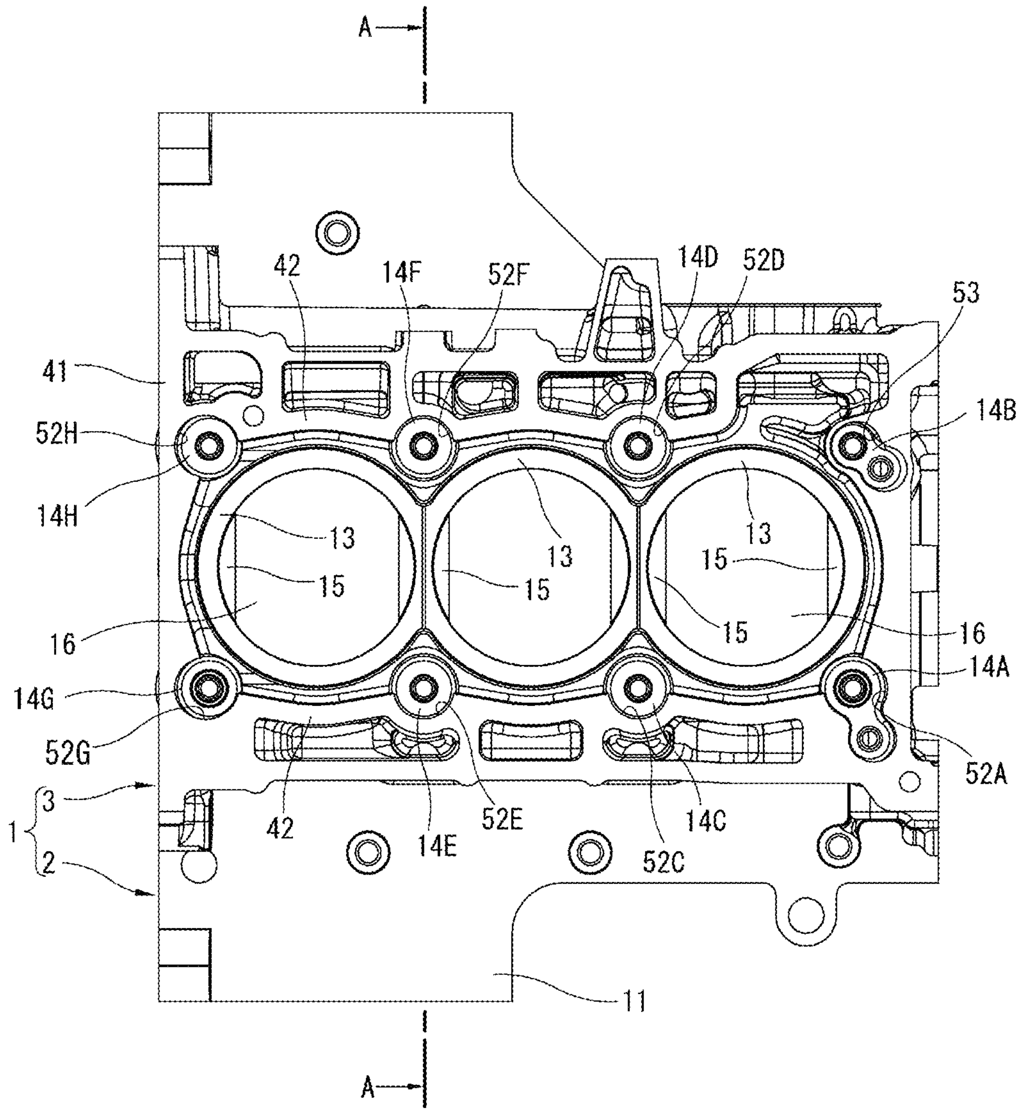
FIG. 2 is a plan view of the composite cylinder block.

The water jacket constituting wall 42 does not include a concave recessed surface (as a columnar part-facing surface) corresponding to the second columnar part 14B. A second columnar part insertion hole 53 (see FIGS. 6 and 19) is formed in a tubular shape along the cylinder axis direction, at a position outward of the water jacket constituting wall 42 (more specifically, outward of the first cylinder-facing surface 51A or eighth cylinder-facing surface 51H), such that the second columnar part 14B is independent of the water jacket. The second columnar part insertion hole 53 has a cross sectional shape extending along the outer contour of the "8"-shaped cross-sectional second columnar part 14B with a slight spacing left along the entire circumference. The second columnar part insertion hole 53, which is shaped in cross section according to the "8"-shaped outer contour as mentioned above, has an upper end open at the upper surface of the upper deck 41 and extends downward from the upper surface of the upper deck 41. Accordingly, the second columnar part 14B is fitted in the second columnar part insertion hole 53 with a slight spacing left around the entire circumference as shown in FIGS. 1 and 2.

The joint flange part 43 is formed to project inwardly from the lower end of the water jacket constituting wall 42 and is aligned together with the lower end face of the water jacket constituting wall 42 along one plane orthogonal to cylinder axis direction to define an outer-member-side mating surface 57. The outer-member-side mating surface 57 is basically shaped according to the area of the top surface 22 of the base part 12 of the main block body 2. In other words, the joint flange part 43 projects in the shape of eaves so as to extend along the contours of the three cylinder walls 13 serially arranged on the top surface 22 of the base part 12 and has seven openings 54 corresponding to seven of the columnar parts 14 other than the second columnar part 14B; and the outer-member-side mating surface 57 is defined continuously on the lower side of the joint flange part. The six openings 54 for the third to eighth columnar parts 14C to 14H are circular-shaped, whereas the opening 54 for the first columnar part 14A is substantially "8"-shaped in cross section as in the case of the first columnar part-facing surfaces 52A. The outer opening edges of the respective openings 54 are made continuous in the cylinder axis direction with no difference in level from the corresponding columnar part-facing surfaces 52.

Figure 7:
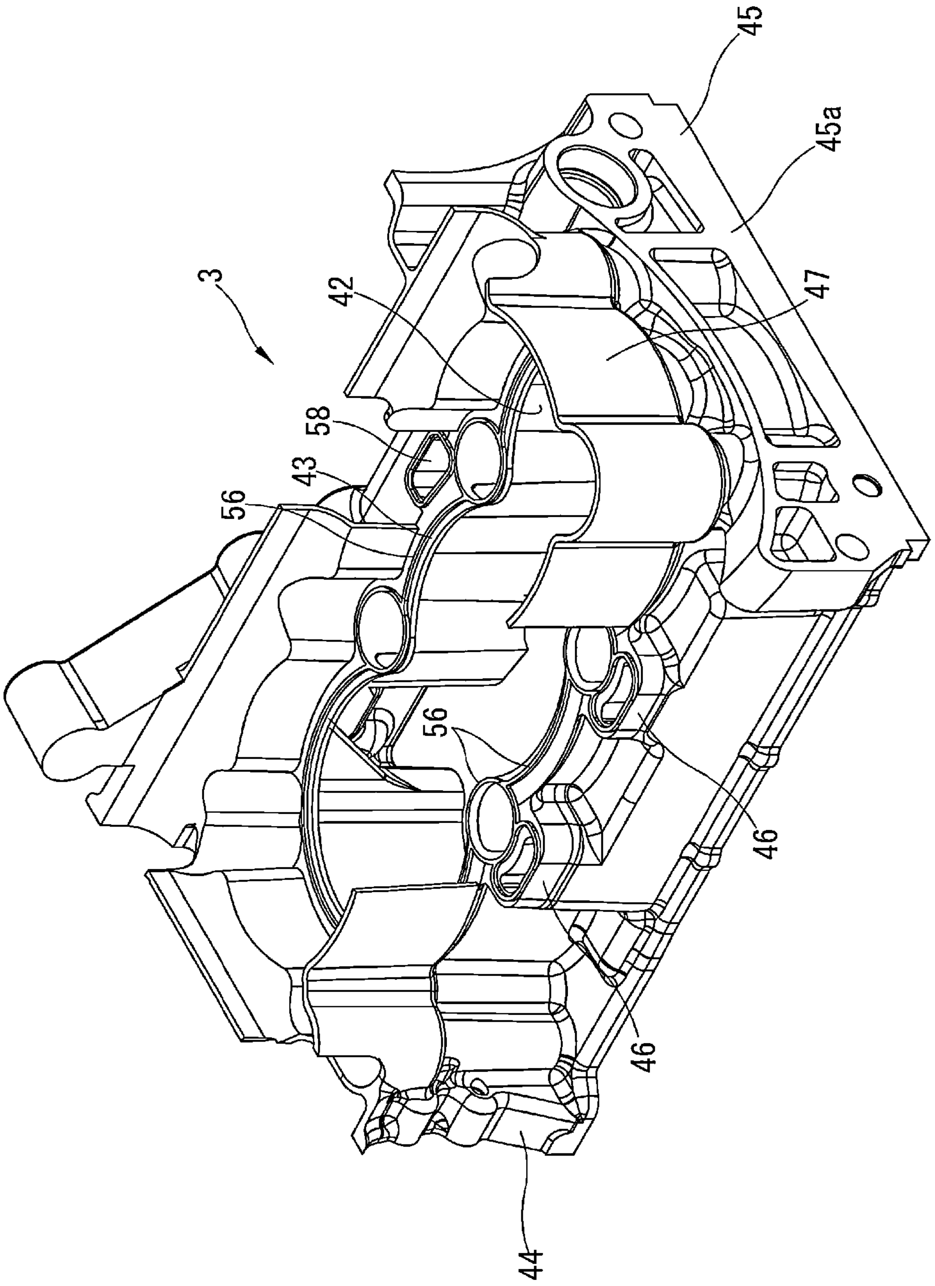
FIG. 7 is a perspective view of the outer member in a vertically inverted state.
Figure 8:
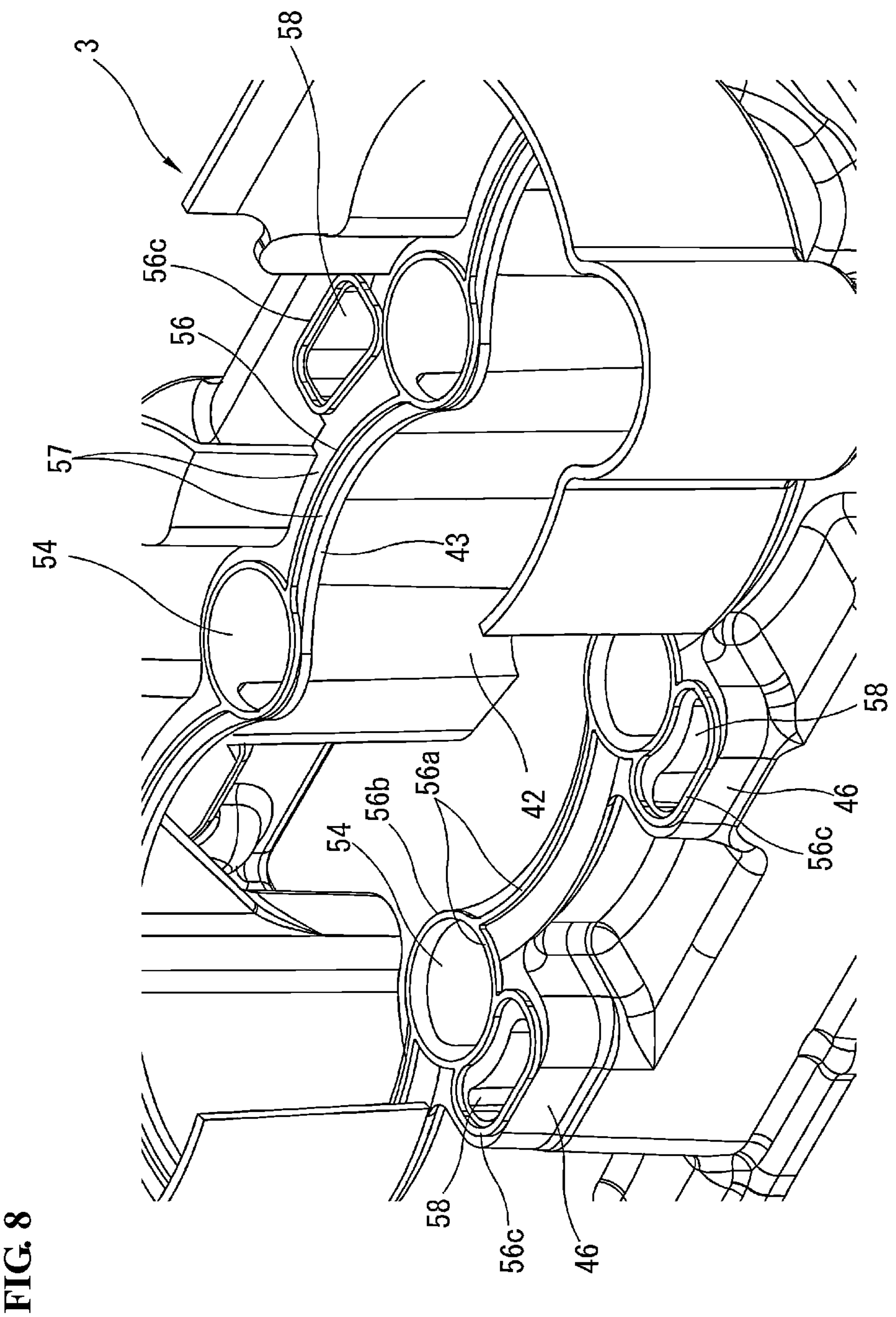
FIG. 8 is an enlarged view of a part of FIG. 7.
Figure 10:
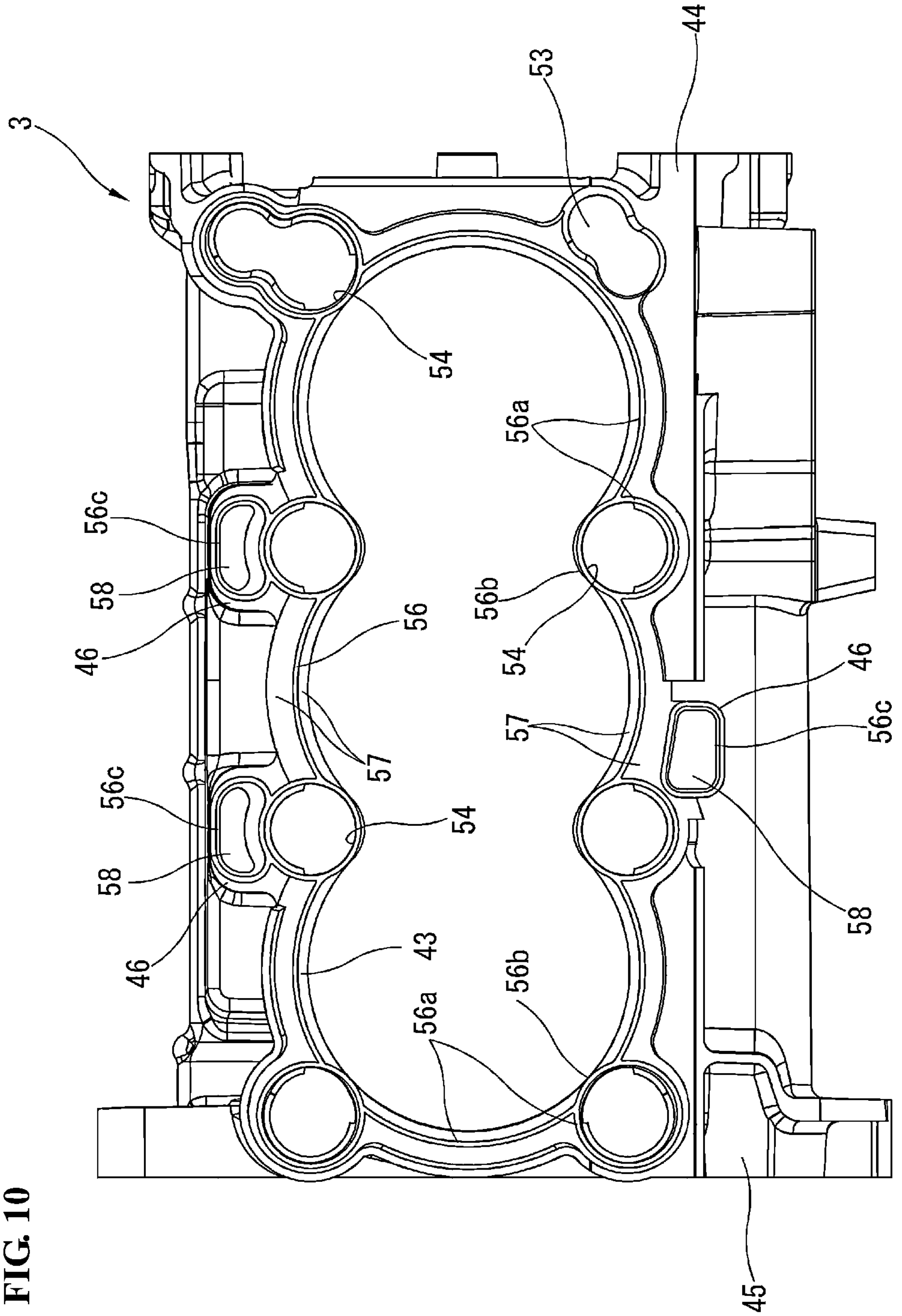
FIG. 10 is a bottom view of the outer member.

The outer-member-side mating surface 57, which includes the lower end face of the water jacket constituting wall 42 and the lower surface of the joint flange part 43, are provided with welding ribs 56 for heat welding of the synthetic resin material as shown in FIGS. 7, 8 and 10. The welding ribs 56 are each in the form of a bead having a constant width and protruding downward from the outer-member-side mating surface 57. Herein, the welding ribs 56 contain: a main welding rib 56*a* extending continuously over the entire circumference around the three cylinder walls 13 and the seven columnar parts 14 in the same manner as the contour of the water jacket constituting wall 42; and arc-shaped columnar part welding ribs 56*b* respectively extending along the inner regions of the seven openings 54 (in between the cylinders). The columnar part welding ribs 56*b* are continuous to the main welding rib 56*a*.

FIGS. 10 and 8 show the welding ribs 56 on the outer member 3 before the welding process. The height (protrusion amount) of the welding rib 56 is decreased by heat welding so that, in the state where the outer member 3 is welded to the main block body 2 by the welding process, the welding rib 56 merely remains in a slight amount.

The oil drop hole defining portions 46 of the outer member 3 are provided at three locations respectively corresponding to the oil drop hole defining portions 31 of the main block body 2. Each of the oil drop hole defining portions 46 protrudes downward in a tubular form from the upper deck 41. Upper-half oil drop holes 58 are defined in inner circumferential sides of the oil drop hole defining portions 46, respectively, in such a manner as to extend along the cylinder axis direction. The upper-half oil drop holes 58 continue to the corresponding lower-half oil drop holes 32 of the main block body 2, thereby defining oil drop holes from the cylinder head to the crankcase. An upper end of the upper-half oil drop hole 58 is open at a position between the side edge portion 41*a*, 41*b* of the upper deck 41 and the water jacket constituting wall 42. A lower end of the upper-half oil drop hole 58 is open at the same plane as the lower end face of the water jacket constituting wall 42 and the lower surface of the joint flange part 43 such that the lower end opening has an elongated shape along the cylinder row direction as shown in FIGS. 7 and 10. In other words, a lower end face of the oil drop hole defining portion 46 constitutes a part of the outer-member-side mating surface 57; and the lower end of the upper-half oil drop hole 58 is open at the outer-member-side mating surface 57. Welding ribs 56 of the same type as mentioned above (as oil drop hole welding ribs 56*c*) are formed on the outer-member-side mating surface 57 so as to surround the upper-half oil drop holes 58, respectively.

The front-side flange part 44 has an upper end portion continuous to the front end edge portion 41*c* of the upper deck 41, thereby defining a flange surface 44*a* (see FIG. 6) of relatively high rigidity. Similarly, the rear-side flange part 45 has an upper end portion continuous to the rear end edge portion 41*d* of the upper deck 41, thereby defining a flange surface 45*a* (see FIG. 7) of relatively high rigidity. These flange surfaces 44*a* and 45*a* are oriented along planes orthogonal to the cylinder row direction.

The lower lateral wall part 47 extends downward along the cylinder axis direction from a position on an outer circumferential side of the outer-member-side mating surface 57 so as to surround the circumference of the base part 12 of the main block body 2. A lower end of the lower lateral wall part 47 is provided so as to, when the outer member is assembled with the main block body 2, reach the vicinity of the upper surface of the upper deck 41. Further, cuts are made in the lower lateral wall part 47 at positions corresponding to the oil drop hole defining portions 46 in order to avoid interference with the oil drop hole defining portions 21 of the main block body 2.

A coolant inlet hole 59 (see FIG. 6) is formed in the eight cylinder-facing surface 51H, which is located lateral to the #1 cylinder, such that the coolant inlet hole extends from the outer surface of the outer member 3 to the water jacket.

Next, the welding process of the main block body 2 and the outer member 3 and the composite cylinder block 1 obtained as the final product by the welding process will be explained below.

As mentioned above, the metallic main block body 2 and the synthetic resinous outer member 3 are separately produced and then joined together by a heat welding technique (that is, a sort of hot plate welding). The welding is done between the top surface 22 of the base part 12 and the outer-member-side mating surface 57. In the welding process, a heater for heating is placed on the lower side of the lower deck 11 of the metallic main block body 2. In the state where the main block body 2 and the outer member 3 are separate, the base part 12 is heated from the lower side by the heater. For example, the heater is of the type having a plate shape with four rectangular openings through which the main bearing parts 15 pass. The heater is disposed within the range that covers at least the area of projection of the base part 12 so as to be substantially brought into close contact with the lower surface of the lower deck 11. By heating with the heater, the temperature in the vicinity of the top surface 22 of the base part 12 used as the mating surface of the main block body 2 is raised to an adequate temperature (e.g. about 200 to 300° C.) at which the welding ribs 56 of the synthetic resinous outer member 3 can be melted and softened. Then, the outer-member-side mating surface 57 is brought into close contact with the top surface 22 of the base part 12; and the outer member is pressed against the main block body 2. With this, the welding ribs 56 are melted so that the main block body 2 and the outer member 3 are integrally welded together into one unit. The welding ribs 56 thus provide a substantial seal line between the main block body and the outer member. For increase of joint force, an appropriate primer treatment may be applied in advance onto the top surface 22 of the base part 12 used as the mating surface.

In the integrally welded state, the water jacket as the passage of the coolant is defined between the cylinder walls 13 of the main block body 2 and the water jacket constituting wall 42 of the outer member 3. The water jacket is sealed by the weld joint between the top surface 22 of the base part 12 and the outer-member-side mating surface 56 around the cylinder walls 13. In other words, the water jacket is sealed by the welding ribs 56 as presented as the seal line in FIG. 10. In the state where the welding has been done with the welding ribs 56, the upper end surfaces of the cylinder walls 13 of the main block body 2 and the upper surface of the upper deck 41 of the outer member 3 are aligned in substantially the same plane. In view of the fact that a rubber seal is used as a seal between the upper deck 41 of the outer member 3 and the cylinder head, the upper surface of the upper deck 41 may be set slightly lower in position than the upper end surfaces of the cylinder walls 13 of the main block body 2.

The seven columnar parts 14 other than the second columnar part 14B are each situated inward the water jacket such that the coolant surrounds the outer circumference of these columnar parts 14. The seal line provided by the welding ribs 56 extends on the outer sides of the seven columnar parts 14, that is, the outer sides (i.e. the water jacket constituting wall 42-sides) of the openings 54 and thereby seals the water jacket in the form of enclosing therewith the seven columnar parts 14. Thus, the water jacket of relatively narrow width is present between the outer circumferential surfaces of the columnar parts 14 and the water jacket constituting wall 42 (columnar part-facing surfaces 52) as shown in e.g. FIG. 11.

On the other hand, the second columnar part 14B is placed in the second columnar part insertion hole 53 of the outer member 3 and thus is isolated from the water jacket. In other words, the second columnar part 14B is surrounded by the synthetic resinous wall of the second columnar part insertion hole 53 and is not brought into contact with the coolant. There is a slight clearance left as an air layer between the inner wall surface of the second columnar part insertion hole 53 and the outer circumferential surface of the second columnar part 14B.

The cylinder head (not shown) is disposed on the upper surface of the upper deck 41 and fixed by the cylinder head bolts. The cylinder head bolts are respectively screwed into the bolt holes 24 of the columnar parts 14. Each of the columnar parts 14 used as the bolt boss is continuous in linear form along the cylinder axis direction until reaching the base part 12 so that the load exerted in the cylinder axis direction is linearly transferred to the base part 12 via these columnar parts. The base part 12 is made thick and solid to reliably bear the load transferred from the cylinder head. The main bearing parts 15 are made integral with the solid base part 12 to reliably support the crankshaft.

Furthermore, the oil drop hole defining portions 31 of the main block body 2 and the oil drop hole defining portions 46 of the outer member 3 are coupled together in an abutting manner as shown in FIGS. 1 and 11. The welding ribs 56 (56*c*) provided on the outer member 3 are melted and softened, and then, welded to the mating surface (top surface 22) of the main block body 2 as in the case of the water jacket. With this, the lower-half oil drop hole 32 and the upper-half oil drop hole 48 are continuous to each other to define one passage as an oil drop hole. The oil drop hole is connected at an upper end thereof to an oil drop hole of the cylinder head.

As described above, the composite cylinder block 1 according to the present embodiment is so configured that: the metallic main block body 2, which is subjected to a load or reaction force, has a minimum capacity; and many parts of the cylinder block, such as the water jacket constituting wall 42, are provided as the synthetic resinous outer member 3. This configuration leads to a significant weight reduction of the cylinder block.

The composite cylinder block 1 according to the present embodiment includes: the main block body 2 made of metal material; and the outer member 3 made of resin material and welded to the main block body 2 as described above. The main block body 2 has: the cylinder walls 13 defining therein the cylinder bore 16; and the columnar parts 14 formed at a position apart from the cylinder walls 13. The outer member 3 has: the water jacket constituting wall 42 defining the water jacket with the cylinder walls 13; and the second columnar part insertion hole 53. The second columnar part 14B is placed in the second columnar part insertion hole 53 of the outer member 3 with a predetermined clearance between the second columnar part 14B and the second columnar part insertion hole 53 of the outer member 3 around the entire circumference, in a state of being isolated from the water jacket, and extends to the cylinder head.

Accordingly, the cylinder block 1 has the effect of, at the time of welding the outer member 3 by heating of the main block body 2, preventing interference of the thermally expanded second columnar part 14B with the second columnar part insertion hole 53 of the outer member 3. This enables easy arrangement of the outer member 3 at a desired position on the main block body 2.

After the welding of the outer member 3 to the main block body 2, the clearance between the inner wall surface of the second columnar part insertion hole 53 and the outer circumferential surface of the second columnar part 14B serves as an air layer (insulating layer) in the cylinder block 1. This makes it less likely that the second columnar part 14B and the oil inside the oil passage 26 will be cooled by the coolant during engine warm-up (warm-up of the internal combustion engine), thereby improving warm-up performance.

Further, the pressure from the oil acts on the oil passages 25 and 26. However, the oil passage 25 is formed in the metallic first columnar part 14A; and the oil passage 26 is formed in the metallic second columnar part 14B. Thus, the cylinder block 1 ensures its pressure resistance.

In the present embodiment, the second columnar part 14B has: the main cylindrical columnar portion 14Ba formed as the main columnar portion into which the cylinder head bolt for fixing the cylinder head is screwed; and the sub cylindrical columnar portion 14Bb formed integral with the main cylindrical columnar part as the sub columnar part having formed therein the oil passage 26 for supplying the oil pressurized by the oil pump to the cylinder head.

The cylinder block 1 is thus prevented from being deformed during the casting.

Furthermore, the second columnar part 14B has the pair of recessed gaps 14Bc formed between the outer circumferential surfaces of the main and sub columnar portions 14Ba and 14Bb. By the formation of such recessed gaps 14Bc, the second columnar part 14B is lightened as compared with the case where the second columnar part 14B is formed such that the outer shape of the cross section is elongated circular without having the pair of recessed gaps 14Bc.

Thus, the cylinder block 1 is reduced in weight due to the formation of such recessed gaps 14Bc on the second columnar part 14B.

Although the present invention has been described by way of the above specific embodiment, the present invention is not limited to the above-described specific embodiment. Various changes and modifications of the above-described specific embodiment are possible.

For example, the bolt hole 24 may not be formed in the second columnar part 14B although at least the bolt hole 24 is formed in the second columnar part 14B in the above-described embodiment. In other words, the second columnar part 14B may be of the type having only the oil passage for supplying the oil pressurized by the oil pump to the cylinder head, that is, consisting of the above-mentioned sub columnar portion 14Ab or the like.

Although only the second columnar part 14B among the columnar parts 14 is placed in the outer member 3 in the state of being isolated from the water jacket in the above-described embodiment, the cylinder block may be configured such that all of the columnar parts 14 are placed in the outer member 3 in the state of being isolated from the water jacket. In such a case, it suffices to configure the cylinder block such that all of the columnar parts 14 are placed in the outer jacket 3 with a predetermined clearance left between the columnar parts and the outer member 3 around the entire circumference, in the state of being isolated from the water jacket, and each extends to the cylinder head.

The invention claimed is:

1. A composite cylinder block, comprising: a main block body made of a metal material; and an outer member made of a resin material and welded to the main block body, the main block body having a cylinder wall defining therein a cylinder bore and a columnar part formed at a position apart from the cylinder wall, the outer member being arranged to define a water jacket between the cylinder wall and the outer member, and the columnar part having formed therein a bolt hole or an oil passage, being placed in the outer member with a predetermined clearance left between the outer member and the columnar part, in a state of being isolated from the water jacket, and extending to a cylinder head.

2. The composite cylinder block according to claim 1, wherein the columnar part function as a bolt boss having the bolt hole into which a cylinder head bolt for fixing the cylinder head is screwed.

3. The composite cylinder block according to claim 1, wherein the columnar part has formed therein the oil passage for supplying pressurized oil to the cylinder head.

4. The composite cylinder block according to claim 1, wherein the columnar part comprises: a main columnar portion formed to function as a bolt boss having the bolt hole into which a cylinder head bolt for fixing the cylinder head is screwed; and a sub columnar portion formed integral with the main columnar part and having formed therein the oil passage for supplying pressurized oil to the cylinder head.

5. The composite cylinder block according to claim 4, wherein the columnar part has a pair of recessed gaps between outer circumferential surfaces of the main and sub columnar portions.

* * * * *